United States Patent
Tawney et al.

[11] Patent Number: 5,885,500
[45] Date of Patent: *Mar. 23, 1999

[54] METHOD OF MAKING AN ARTICLE OF FOOTWEAR

[75] Inventors: John C. Tawney; Toren P.B. Orzeck, both of Portland, Oreg.

[73] Assignee: Nike, Inc., Beaverton, Oreg.

[*] Notice: This patent issued on a continued prosecution application filed under 37 CFR 1.53(d), and is subject to the twenty year patent term provisions of 35 U.S.C. 154(a)(2).

[21] Appl. No.: 575,819

[22] Filed: Dec. 20, 1995

[51] Int. Cl.⁶ .................................................. B29C 43/04
[52] U.S. Cl. ................................ 264/154; 264/321
[58] Field of Search .................... 425/119; 264/321, 264/46.5, 154, 155; 36/87

[56] References Cited

U.S. PATENT DOCUMENTS

| | | | |
|---|---|---|---|
| 3,009,204 | 11/1961 | Bingham, Jr. et al. | 425/119 |
| 3,016,569 | 1/1962 | Bingham, Jr. et al. | 425/119 |
| 3,170,178 | 2/1965 | Scholl | 264/321 |
| 3,269,037 | 8/1966 | Massicotte | 36/87 |
| 3,355,535 | 11/1967 | Hain et al. | 264/321 |
| 3,362,091 | 1/1968 | Drago | 36/87 |
| 3,416,174 | 12/1968 | Novitske | 264/321 |
| 3,421,183 | 1/1969 | Grimmeisen | 425/119 |
| 3,439,384 | 4/1969 | Crossen et al. | 264/275 |
| 3,541,646 | 11/1970 | Baudou | 425/119 |
| 3,596,318 | 8/1971 | Kyritsis et al. | |
| 3,641,688 | 2/1972 | von den Benken | 264/321 |
| 3,659,996 | 5/1972 | Schwartz et al. | |
| 3,684,420 | 8/1972 | Barker | |
| 3,766,669 | 10/1973 | Pearsall | 264/321 |
| 3,823,493 | 7/1974 | Brehm et al. | 36/87 |
| 3,846,533 | 11/1974 | Carrier | |
| 3,896,202 | 7/1975 | Palua | |
| 3,897,528 | 7/1975 | Suh | |
| 3,913,160 | 10/1975 | Funck | |
| 3,921,313 | 11/1975 | Mahide et al. | |
| 3,966,381 | 6/1976 | Suh | |
| 3,983,204 | 9/1976 | Opinsky et al. | |
| 3,988,797 | 11/1976 | Tornero | |
| 4,150,455 | 4/1979 | Fukuoka | |
| 4,187,621 | 2/1980 | Cohen | 264/321 |
| 4,245,406 | 1/1981 | Landay et al. | |
| 4,266,314 | 5/1981 | Londner | |
| 4,418,483 | 12/1983 | Fujita et al. | |
| 4,581,187 | 4/1986 | Sullivan et al. | 264/46.4 |
| 4,627,178 | 12/1986 | Sullivan et al. | |
| 4,666,782 | 5/1987 | Tada et al. | |
| 4,674,204 | 6/1987 | Sullivan et al. | |
| 4,694,589 | 9/1987 | Sullivan et al. | |
| 4,864,738 | 9/1989 | Horovitz | |
| 4,960,374 | 10/1990 | Pröll | |
| 5,014,449 | 5/1991 | Richard et al. | |
| 5,015,427 | 5/1991 | Sosnow | |
| 5,106,445 | 4/1992 | Fukuoka | 36/87 |
| 5,177,824 | 1/1993 | Ou | |
| 5,202,069 | 4/1993 | Pontiff | |

FOREIGN PATENT DOCUMENTS 2063227  7/1971  France ................................. 425/119

*Primary Examiner*—Allan R. Kuhns
*Attorney, Agent, or Firm*—Banner & Witcoff, Ltd.

[57] ABSTRACT

A method of making an article of footwear includes the steps of forming a foam shell for an article of footwear by wrapping a foam side wall around the periphery of a base, positioning the foam shell on a last, securing the last and the foam shell within a mold and closing the mold, applying heat and pressure to thereby mold the foam shell to the shape of the last, and then opening the mold and removing the molded article of footwear from the last. In a preferred embodiment, the method further includes the steps of forming an inner bootie, having an inner liner and a foam overlay, and inserting the inner bootie over the last prior to positioning the foam shell thereon. The inner bootie includes the inner liner with the foam overlay attached to selected regions thereof. The step of applying heat and pressure thereby includes molding the inner bootie with the foam shell to form the molded article of footwear.

18 Claims, 6 Drawing Sheets

METHOD OF MAKING AN ARTICLE OF FOOTWEAR

TECHNICAL FIELD

The present invention is directed to a method for manufacturing an article of footwear from foam, and in particular, for molding an article of footwear upper having stiffness variations throughout by combining different grades of foam and applying heat and pressure to mold the foam to the desired shape.

BACKGROUND OF THE INVENTION

Numerous articles of footwear and methods for manufacturing the same are known in the prior art. The simplest of these constructions includes stitching together overlapping layers of leather or cloth to form an upper covering for the foot and then using an adhesive to attach a preformed outsole. The adhesive may be applied with a brush, or alternatively, as in U.S. Pat. No. 3,988,797 to Tornero, a shoe upper may be integrally joined to a preformed rubber outsole by placing both the shoe upper and outsole in a mold cavity and then injection molding an outsole adherent therein in order to join the outsole to the upper. Other constructions include forming an injection molded outsole and/or midsole and integrally joining the upper during the molding process of the sole unit. For example, U.S. Pat. No. 4,245,406 to Landay et al. discloses an athletic shoe in which an upper and a preformed rubber outsole are joined by a foamed polyurethane, injection-molded midsole. The shoe is manufactured by treating the inner surface of a preformed rubber outsole to prepare it for bonding to polyurethane, inserting the treated sole into the bottom of a mold, mounting a preformed upper on a last, lowering the last and closing the mold, with the last spaced above the rubber outsole, injecting a charge of foamable polyurethane between the outsole and the last, and allowing the polyurethane to foam under self-generated pressure to form the midsole and to bond with the outsole and upper.

Each of the above constructions utilizes an injection molding process to form all or part of the sole unit or to adhere the sole to the preformed upper. Further methods of construction, such as those disclosed in U.S. Pat. No. 4,150,455 to Fukuoka and U.S. Pat. No. 4,266,314 to Londner epouse Ours, extend the injection molding to improve the upper portion of the article of footwear. Fukuoka disposes an upper base in a mold and then injects a synthetic resin material for the upper into the upper molding cavity. After the upper portion of synthetic resin is cooled, the upper is transferred to the mold for the sole and the sole portion of synthetic resin is injected into the sole molding chamber. After the sole portion of synthetic resin is cooled, the finished molded shoe of synthetic resin is removed from the mold. Londner epouse Ours discloses a lining of leather or other suitable material for the shoe upper onto which are overmolded two overlapping portions of plastic materials of different types. The first layer of plastic material injection molded in direct contact with the lining and covers the entire upper while the second injection molded portion constitutes a stiffening reinforcement that surrounds only the rear counter of the upper and a thin intermediate sole. An outer wearing sole is then added to the article of footwear. The injection molding processes utilized in the above prior art, whether to mold only the sole or portions of the upper as well, have the disadvantages of requiring an additional finishing step for the upper of the article of footwear, injecting parts having difficult areas to fill while being limited to only one foam material per pour; these requirements limited the available foams to those which provided acceptable cosmetics, bonding strength and split tear resistance, no air bubbles, exposure to the elements survival, whiteness/color retention, and were generally flash control foams, such as DALTOPED and similar polyester and polyether based elastomer systems offered by ICI Americas Inc.

SUMMARY OF THE INVENTION

The present invention overcomes these disadvantages by providing a method of making a finished article of footwear upper and midsole from a foam material, but without injection molding. The method includes the steps of forming a foam shell for the article of footwear by wrapping a foam side wall material with variable physical properties around the periphery of a base, a portion of which is preferably foam, positioning the foam shell on a last, securing the last and the foam shell within a mold and closing the mold. Heat and pressure are then applied to mold the foam shell to the shape of the exterior and then, after opening the mold, the molded article of footwear is removed from the last. The method further includes the steps of forming an inner bootie and inserting the inner bootie over the last prior to positioning the foam shell thereon. Thus, the step of applying heat and pressure molds the inner bootie with the foam shell to form the article of footwear. The inner bootie includes an inner liner and a foam overlay which is attached to selected regions of the inner liner. Thus, the variance in the thickness of the foam allows the stiffness of the article of footwear to be adjusted in selected regions. The present invention provides the ability to position and provide the correct amount and type of material for each particular location as opposed to the injection process that is limited to one material provided everywhere.

The foam shell may be formed with a foam side wall having a uniform thickness throughout or with varying thicknesses and/or varying materials at selected regions. The foam sidewall also may be comprised of foams of varying densities and variances of rigidity. The step of applying heat and pressure while the last is positioned in the mold forms regions of increased foam thickness in the article of footwear as well as regions of decreased foam thickness in the article of footwear. An exterior layer of material may also be provided over the foam side wall to form the exterior surface of the article of footwear. In a further embodiment, a selected region of foam may also be removed entirely from the foam side wall to form an opening in the side wall. The application of heat and pressure thus forms a region of no foam thickness in the article of footwear by molding directly together the liner of the inner bootie and the exterior layer of material on the foam side wall by fusing together their adhesive linings.

The present invention thus provides a method for forming an article of footwear to virtually the exact shape of the last and allows a variety of sizes of the article of footwear to be manufactured merely by changing the last within the mold. For example, for a given size of a foam shell, variations of up to two or three full sizes can be accomplished by changing the size of the last. The present invention thereby provides a method for forming a custom molded article of footwear for an individual wearer, once a last corresponding to the user's foot has been made.

BRIEF DESCRIPTION OF THE DRAWINGS

The above description and other objects, advantages, and features of the present invention will be more fully understood and appreciated by reference to the specification and accompanying drawings, wherein.

DETAILED DESCRIPTION OF THE PREFERRED EMBODIMENTS

Figure 9:
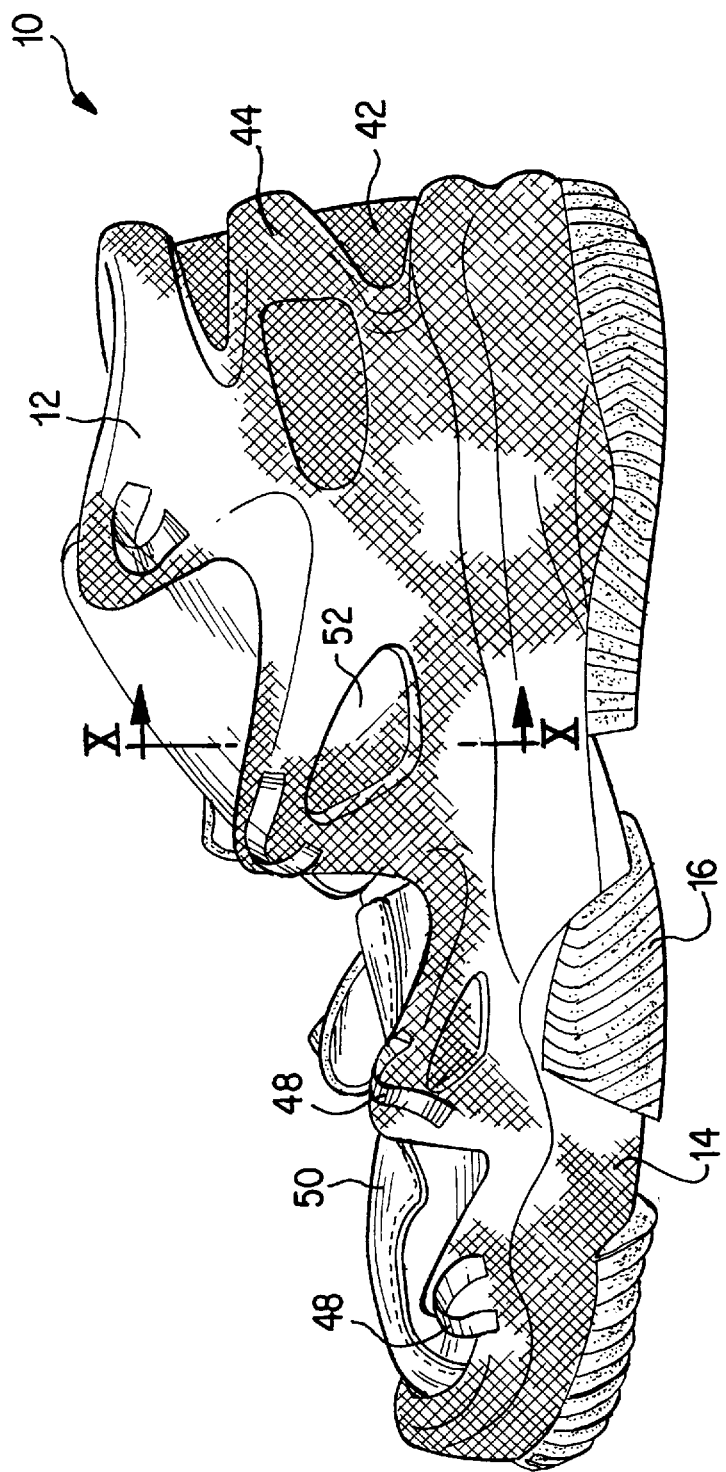
FIG. 9 is a side elevational view of an article of footwear formed in accordance with the present invention.

An article of footwear manufactured in accordance with the present invention is illustrated generally by the reference numeral 10 in FIG. 9. Article of footwear 10 preferably includes a molded finished upper 12, a molded midsole unit 14, an optional cushioning unit (not shown), and an outsole 16. The finished upper 12 and midsole 14 are molded from a foam material and the outsole 16 is then adhered to the bottom surface thereof after the molding process. Alternatively, it is possible to attach outsole 16 to upper 12 and midsole 14 and mold all components together at the same time to provide a completely finished shell. Article of footwear 10 is designed to have stiffness variations in localized regions of the upper and midsole dependent upon the desired cushioning and support for a specific region. As described in detail below, the variation in the stiffness of the article of footwear may be obtained by utilizing different grades of foam material, or different foam materials, the same foam material with different density, or the same foam material with a different quantity in the localized regions, and forming the upper 12 and midsole 14 through an application of heat and pressure to mold the foam to the desired shape.

Figure 1A:
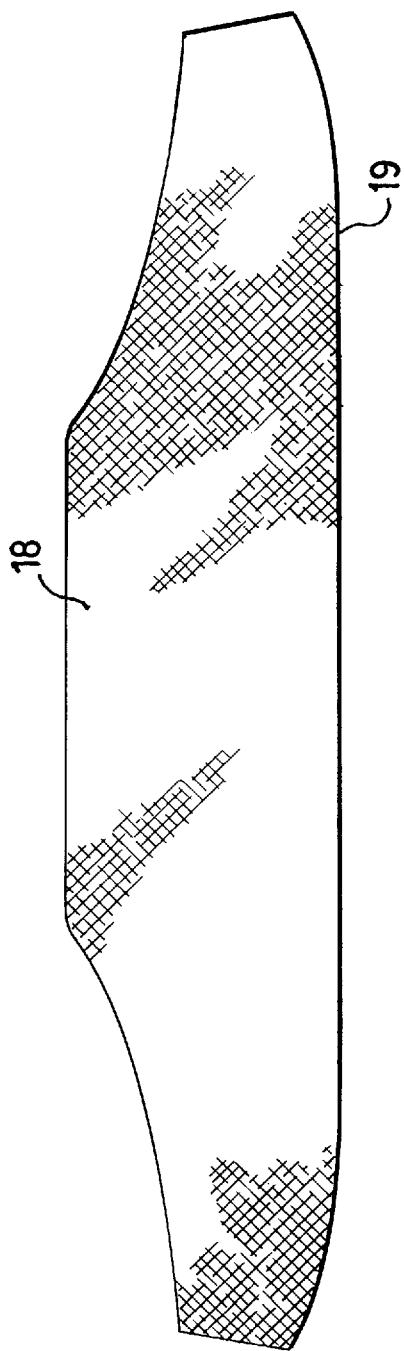
FIGS. 1(A) and 1(B) are plan views of a foam sidewall and a foam bottom prior to assembly of the foam shell in accordance to the present invention.
Figure 1B:
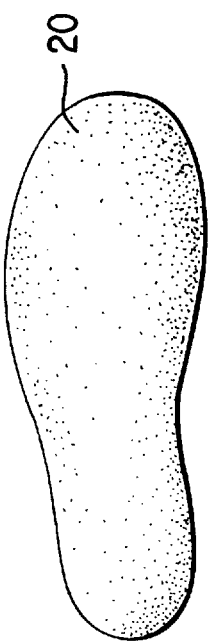
Figure 3:
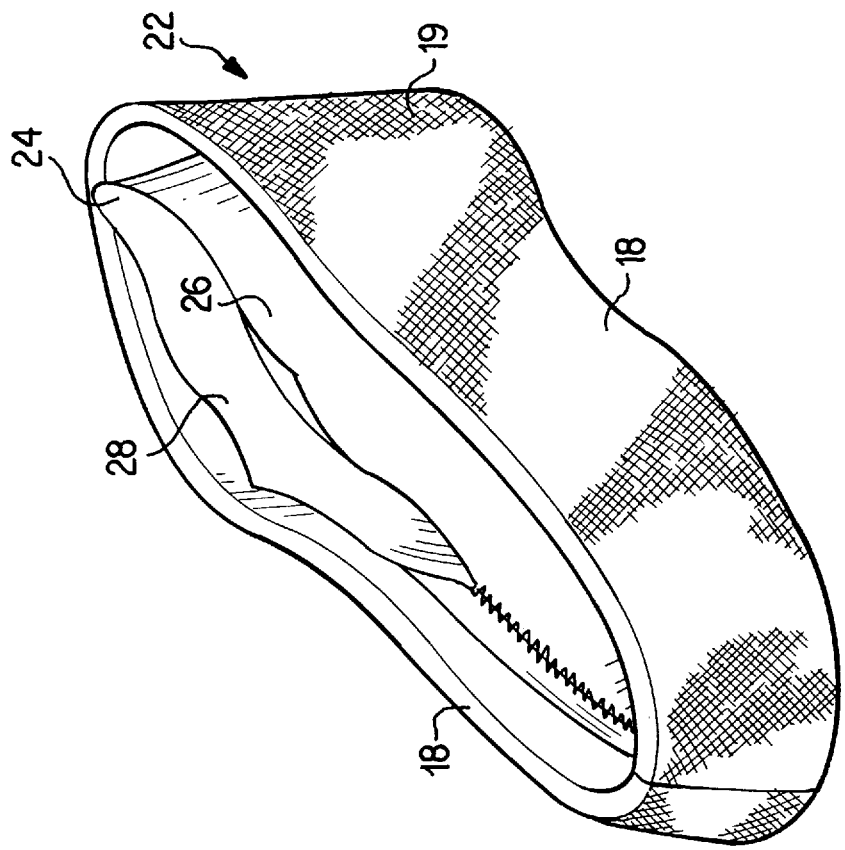
FIG. 3 is a perspective view of an assembled foam shell with the inner bootie of FIG. 2 therein.
Figure 2:
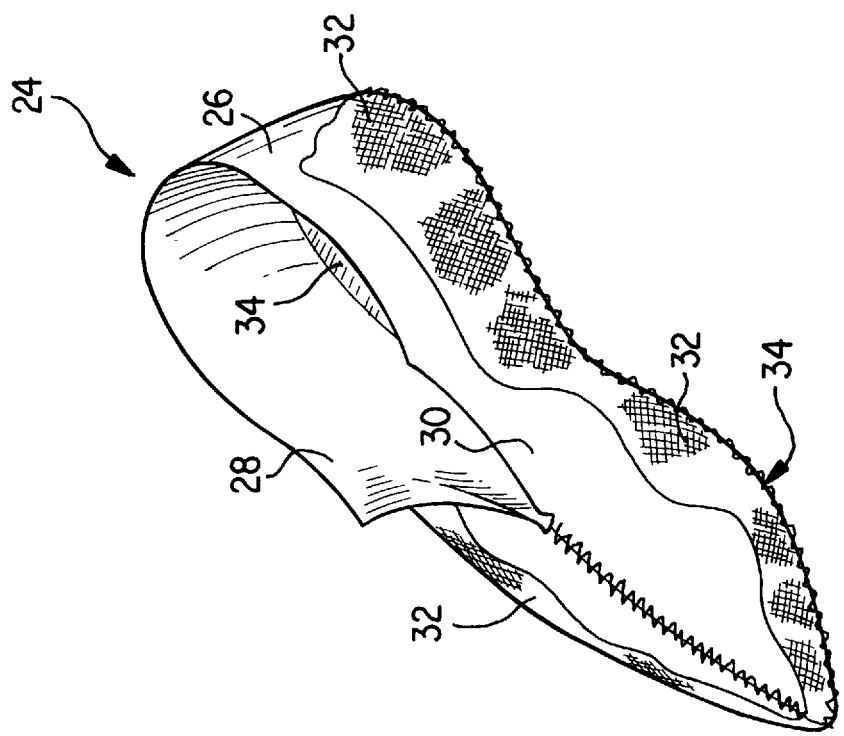
FIG. 2 is a perspective view of an inner bootie according to the present invention.

Referring to FIGS. 1–3, upper 12 and midsole 14 are constructed from a foam sidewall 18 and a foam base 20 which are combined together to form a foam core 22. Foam base 20, depending on the materials used to form it, their thickness and the type of shoe being manufactured, can function as an insole, or a combined insole and midsole. Foam sidewall 18 and foam base 20 as illustrated are one-piece components made of EVA, polyolefin foam and having a uniform thickness although, as discussed below, a non-uniform thickness may also be utilized. Other foams which can be used to form the sidewall 18 and/or base 20 include DuPont EVA 6301 (75% VA) and CIL EVA (18% VA). Foam side wall 18 is wrapped around foam base 20 and the two parts are adhered together, preferably only along the bottom edge and the toe area, to form foam core 22. The exterior surface of foam side wall 18 may include a material surface layer 19 which will form the finished exterior surface of the upper 12 and which acts to strengthen the foam and provide for cosmetics and environmental factors. Material layer 19 may be a solid color as illustrated or include any type of ornamentation, outer counters, lace locks, etc., or decoration which makes the finished upper more appealing to the user and which achieves a durable, flexible, and abrasion resistant exterior surface. An inner foam bootie 24, as shown in FIG. 2, is preferably inserted within foam core 22 to provide a dual density foam upper. Inner bootie 24 includes an inner liner 26 and a foam overlay 32. Inner liner 26 is stitched or otherwise attached to a bottom liner 34 to form a stretchable, glove-like liner for a mold core. The material used to form liners 26 and 34 is preferably DuraPlush®, a synthetic woven material having a soft, pliable and comfortable interior surface 28 for contact with the foot and a urethane adhesive applied to the exterior surface 30 to promote the bond between the liner exterior surface 30 and foam core 22 or foam overlay 32. As shown, selected regions generally along the sides of exterior surface 30 are covered by foam overlay 32 in order to provide more cushioning to the ankle and instep regions of the foot. Foam overlay 32 is preferably a foam such as EVA that will form a molded shape or urethane that will not form a molded shape, and may be more or less dense than the foam used to form foam core 22 depending on the location. Thus, during the molding process, as discussed below, foam overlay 32 may or may not compress to the same degree as the foam of foam core 22, depending on the foam material, and an article of footwear 10 is formed having stiffness variations in the upper 12.

Each of the components discussed above and the additional parts discussed below, must be primed or prepared with an adhesive prior to placement within the mold such that they will adhere during the molding process. It is not necessary to securely bond the components together, as long as they are correctly positioned such that when the mold closes the components are in the correct orientation to each other.

Figure 4:
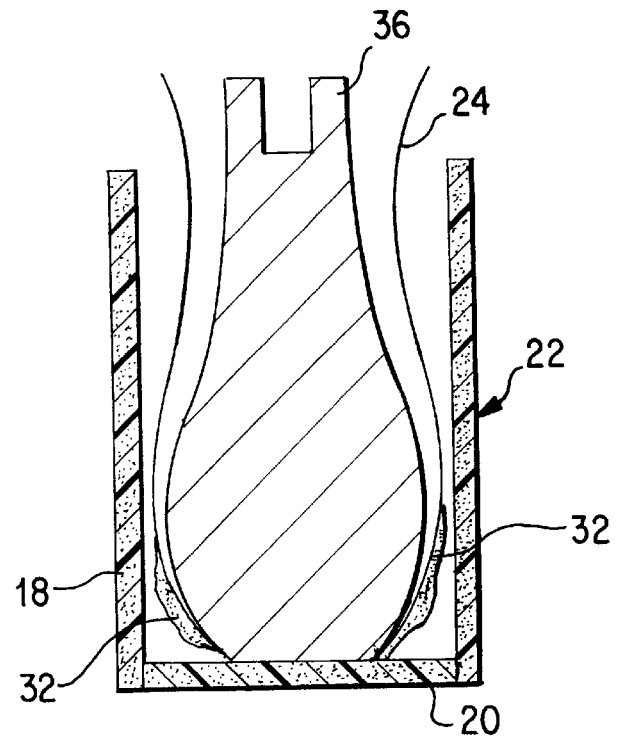
FIG. 4 is a cross-sectional view of the assembled foam shell and inner bootie disposed on a mold core.
Figure 5:
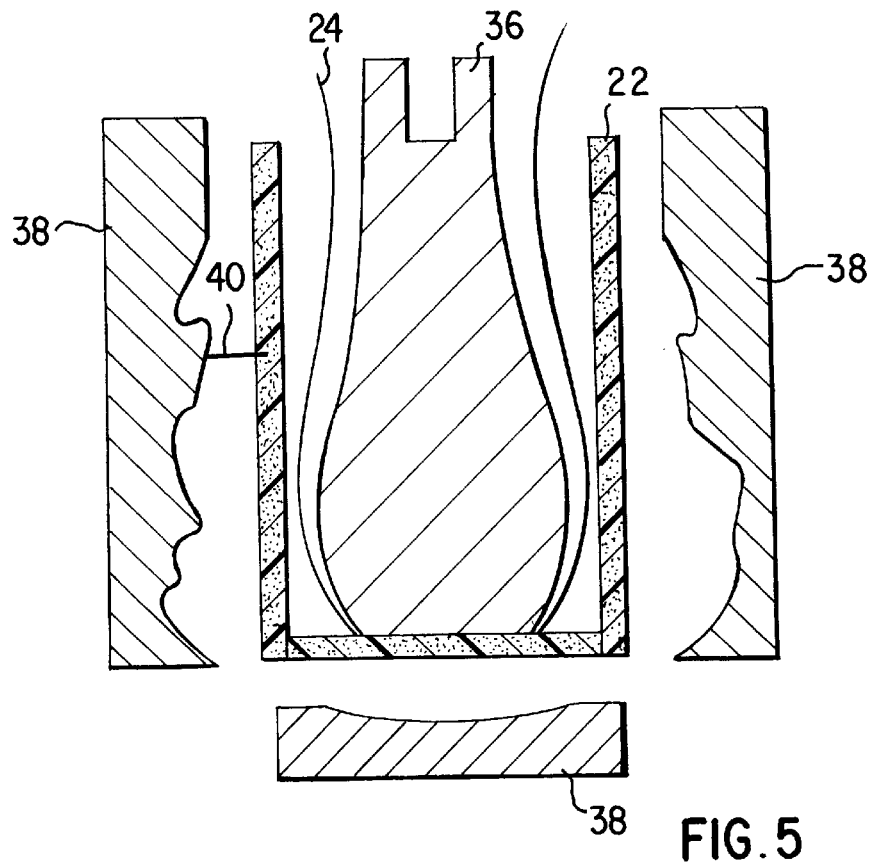
FIG. 5 is a diagrammatic view of the mold core assembly of FIG. 4 positioned within a mold.

Thus, properly prepared foam core 22 and foam bootie 24 are then disposed on the last or mold core 36 in preparation for the molding process. As shown in FIGS. 4 and 5, mold core 36 is mounted within a mold 38, shown as a two-part mold in the preferred embodiment, and a pin 40 is used to secure the foam core 22 within mold 38. Either plastic inserts, depressions or holes cut in the foam core 22 may also be used to accurately position the foam core within the mold cavity 38 and/or around the last or mold core 36 by mating these elements with projections or depressions in the last or mold core.

Once the mold cavity 38 is closed, heat and pressure are applied in order to activate the adhesive primer and mold the foam to the desired form. This provides exceptional bonding of the components and eliminates individual pressing or attachment operations or the need for perfect matching parts to assemble the finished article of footwear. In a preferred embodiment of the invention, heat and pressure are applied simultaneously for a predetermined time and then they are both turned off and cooling is established to allow the foam to set. The applied heat is generally between 250° F. and 350° F., with the preferred temperature being approximately 300° F. The applied pressure is generally between 50 and 150 psi, with the preferred pressure being approximately 100 psi. The heat and pressure are applied for approximately 15 minutes and then allowed to cool so that the foam will set.

Then, the mold is opened and the molded article of footwear 10 is removed. Since the foam core is molded directly around the mold core 36, the process of the present invention creates an article of footwear having a footshape virtually identical to the shape of the last or mold core 36. This process not only produces an article of footwear with a seamless shoe interior but also allows for a variety of sizes and customized articles of footwear merely by using a different last or mold core 36 within the same outer mold 38.

After removal from mold 38, the edges of the molded article of footwear 10 are trimmed, if necessary, dependent upon the shape of the foam core 22. The material layer 19 and foam sidewall 18 can be formed "tall" to extend past the desired height of the article of footwear during the molding process and then be trimmed off after the molding process is complete. Alternatively, foam core 22 can be carefully finished such that material layer 19 and foam sidewall 18 do not extend past the desired height of the article of footwear. In this instance, the present invention provides more finished and softer edges once the molding process is complete. Further, material layer 19 can be formed to extend past side wall 18, and then folded over the upper foam edge to give a finished edge surface. In each case, once the edges are properly finished, all that remains to complete the article of footwear is to attach an instep covering portion and adhere an outsole.

Figure 6:
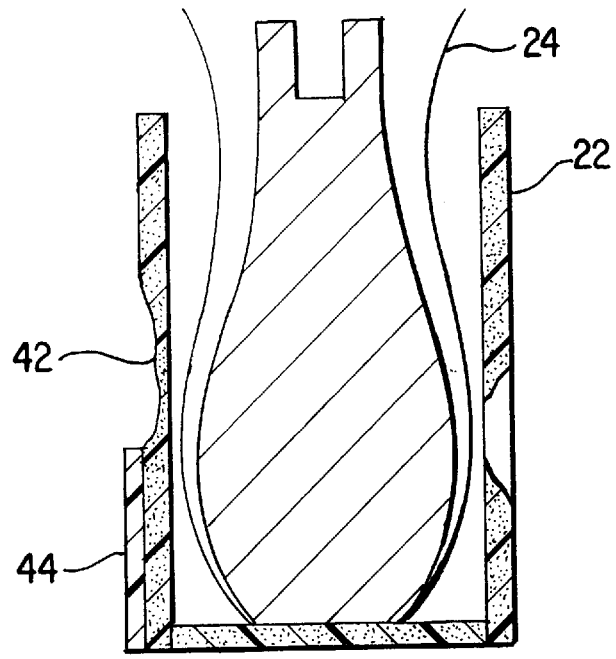
FIG. 6 is a cross-sectional view of an assembled foam shell and inner bootie according to a further embodiment of the present invention.

Referring to FIG. 4, a cross-section through the preferred foam core 22 illustrates the uniform thickness thereof and the positioning of foam overlay 32 in only selected regions of the upper. There are, however, several options for varying the preformed foam core to meet particular conditions. As shown in FIG. 6, foam core 22 may be provided with thinner portions 42 and thicker portions 44 in order to provide localized changes in the stiffness of the molded upper 12. That is, a thinner portion 42 of foam material provides a softer area to the upper 12, such as for greater flexibility, cushioning, comfort, and the like, while a thicker portion 44 of foam material provides a stiffer area to the upper, such as for ankle support, forefoot support, and medial/lateral stiffeners.

In accordance with the present invention, localized changes of the foam material can achieve the above benefits and also allow for specific non-thermoset areas, e.g., areas where it is not desired for the foam to compress and set to a give shape, such as the footbed. Non-thermoset areas are formed merely by utilizing a foam material which will not compress under the applied conditions of heat and pressure, such as polyurethane which will not compress at a temperature of 300° F. and a pressure of 100 psi, for example. Alternatively, as discussed further below, an area of the foam may be removed from the foam side wall 18 to provide an opening therein. Thus, during the molding process, the area of removed foam will form a non-thermoset area due to the lack of foam material at the localized area. The base forming the insole or combined insole/midsole may also be varied to customize or vary the footbed. Stiffness may be enhanced in certain areas, or the entire foot contact surface may be given a soft feel by using a top layer of non-thermoset material.

Figure 7:
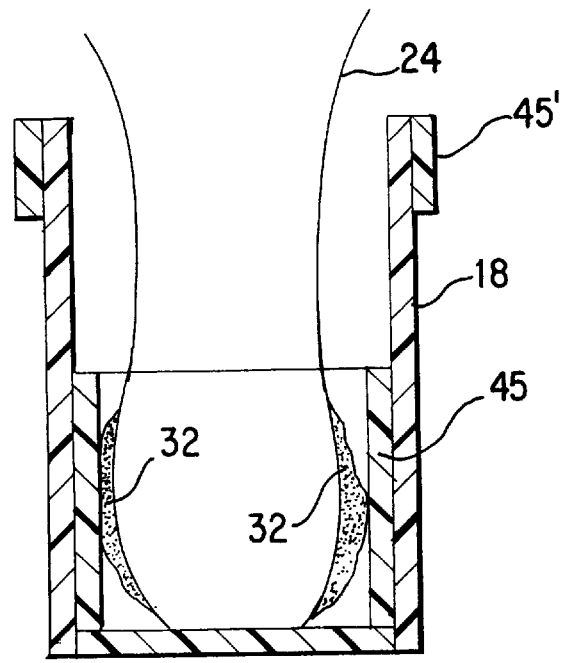
FIG. 7 is a cross-sectional view of an assembled foam shell and inner bootie according to a still further embodiment of the present invention.

In a further embodiment of the present invention, the performance characteristics of molded upper 12 may be locally changed by positioning various additional elements with the foam core prior to the molding process. Referring to FIG. 7, a universally-shaped thermoplastic reinforcement 45 such as a generally shaped heel counter may be positioned between foam sidewall 18 and foam bootie 24 or, alternatively, reinforcement 45' such as an ankle support may be positioned on the exterior surface of foam sidewall 18. After the molding process, the universally or generally shaped reinforcement takes on the precise desired shape. Placement of the reinforcements or other additional elements exterior to the foam sidewall 18 or even between layers of foam on the upper, the present invention provides a layer of molded foam between the reinforcement and the foot of the user. The intervening layer of foam acts to protect the user's foot from localized pressure and/or impacts from external loads. Other universally-shaped thermoplastic or additional parts such as closure elements, eyelet reinforcements, ankle support devices, forefoot stability supports, etc., may also be disposed between the foam layers prior to the molding process and then formed to the desired shape during the molding process along with the foam core 22. Thus, the need for stock-fitting matching components after the molding process is eliminated.

Figure 8:
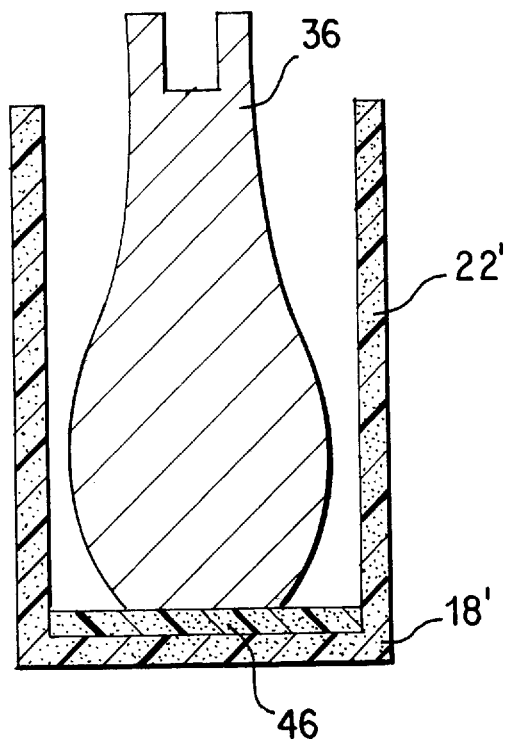
FIG. 8 is a cross-sectional view of an assembled foam shell according to another embodiment of the present invention.

Still further, foam core 22' may be formed from a foam wall 18' and a filler element 46 as shown in FIG. 8. In this embodiment of the present invention, wall 18' is wrapped around the lateral side, bottom surface, and medial side of the mold core 36, thereby eliminating the use of a foam base as in FIG. 1. A foam filler element 46 is either already attached to the mold core 36 or to foam wall 18'. Filler element 46 wraps around the mold core from the front to the rear to thereby completely surround the toe area and heel area of the mold core 36 prior to the molding process.

Figure 10:
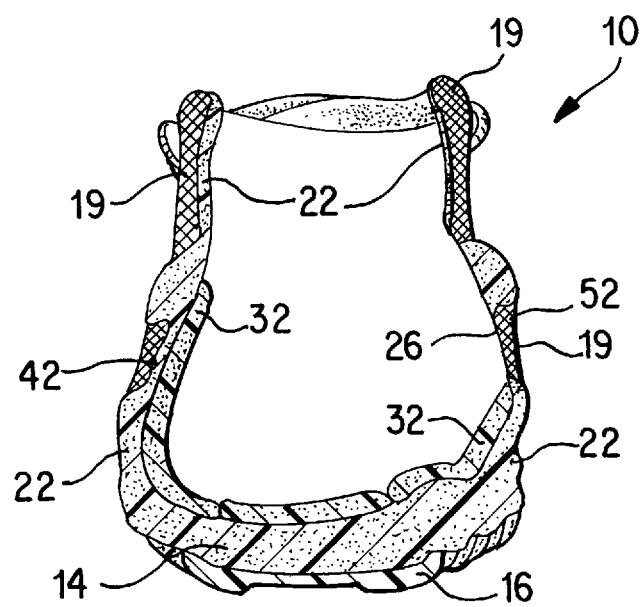
FIG. 10 is a cross-sectional view taken generally along the line 10—10 of FIG. 9.

A finished article of footwear 10 in accordance with the present invention is illustrated in FIGS. 9 and 10. Molded upper 12 may include closure elements 48, thinner portions 42, thicker portions 44, as well as finishing elements such as the instep covering layer 50 that may be stitched or otherwise attached to the molded upper 12. Outsole 16 is also adhered to the finished molded upper 12 and midsole 14. As discussed above, molded upper 12 also includes a non-thermoset area 52 having no compressed foam between material layer 19 and inner liner 26 because a corresponding area of foam was removed from foam sidewall 18 prior to the molding process. This use of removed foam can form decorative patterns in the molded upper 12, such as the triangular elements illustrated, as well as provide extremely soft, lightweight, and flexible areas on the upper. Article of footwear 10, as a whole, is extremely lightweight due to the integration of the components and the assembly thereof in accordance with the present invention.

It can be readily understood that a variety of alternate or equivalent methods, processes and manufacturing techniques could be used to derive the article of footwear of the present invention. It will also be obvious to those of ordinary skill in the art that numerous modifications may be made without departing from the true spirit and scope of the present invention, which is to be limited only by the appended claims.

We claim:

1. A method of making an article of footwear, said method comprising the steps of:
   (A) forming a foam shell for an article of footwear by wrapping foam material defining a side wall of said foam shell around the periphery of a base;
   (B) positioning the foam shell on a last;
   (C) securing the last and the foam shell within a mold and closing the mold;
   (D) shaping said foam material by;
      (i) applying heat and pressure to said foam side wall,
      (ii) thermally and compressively forming at least a portion of said foam material in the shape of said last, (iii) cooling said portion of said foam material in a compressed state, and (iv) setting said portion of said foam material in the shape of said last while said portion of said foam material is in said compressed state; and (E) opening the mold and removing the molded article of footwear from the last.

2. The method of claim 1 wherein the step of forming a foam shell includes forming at least a portion of the base of a foam material.

3. The method of claim 1 further comprising the steps of forming an inner bootie, having an inner liner and a foam overlay, and inserting the inner bootie over the last prior to positioning the foam shell thereon; wherein said step of applying heat and pressure includes molding the inner bootie with the foam shell to thereby form the article of footwear.

4. The method of claim 3 wherein the step of forming the inner bootie includes forming an inner liner and attaching the foam overlay to selected regions of the inner liner.

5. The method of claim 1 wherein said step of forming the foam shell includes providing a foam side wall having a uniform thickness throughout.

6. The method of claim 1 wherein said step of forming the foam shell includes providing a foam side wall having a varying thickness at selected regions.

7. The method of claim 6 wherein said step of applying heat and pressure includes forming regions of increased foam thickness in the article of footwear.

8. The method of claim 6 wherein said step of applying heat and pressure includes forming regions of decreased foam thickness in the article of footwear.

9. The method of claim 3 wherein said step of forming the foam shell further includes providing an exterior layer of material over the foam side wall to form the exterior surface of the article of footwear.

10. The method of claim 9 wherein said step of forming the foam shell includes removing a selected region of foam from the foam side wall to form an opening in the side wall.

11. The method of claim 10 wherein said step of applying heat and pressure includes forming regions of no foam thickness in the article of footwear by molding directly together the liner of the inner bootie and the exterior layer of material on the foam side wall corresponding to the selected region of removed foam.

12. The method of claim 3 further comprising positioning an additional element on the foam shell prior to said step of applying heat and pressure and thereby molding the additional element simultaneously with the article of footwear.

13. The method of claim 12 wherein said step of positioning the additional element includes positioning the additional element exterior to the foam side wall.

14. The method of claim 12 wherein said step of positioning the additional element includes disposing the additional element between the foam side wall and the inner bootie.

15. The method of claim 1 wherein said step of applying heat and pressure includes applying heat for a predetermined period of time and then applying pressure for a predetermined period of time in a repeated cycle.

16. The method of claim 1 wherein said step of applying heat and pressure includes applying heat and pressure simultaneously for a predetermined period of time and then discontinuing the heat and pressure for a predetermined period of time in a repeated cycle.

17. The method of making an article of footwear according to claim 1 wherein said base includes a foam material; and wherein said molding step includes molding said foam material of said base by applying heat and pressure to said base so that at least a portion of said base foam material compresses and sets in the shape of a portion of said last.

18. A method of making an article of footwear, said method comprising the steps of:

(A) forming a foam shell for an article of footwear having a flexible upper by positioning a foam side wall around the periphery of a base;

(B) controlling the stiffness of the upper by forming at least a part of said foam side wall with a predetermined quantity of a foam material;

(C) positioning the foam shell on a last;

(D) securing the last and the foam shell within a mold and closing the mold;

(E) shaping and stiffening said foam material by:
  (i) applying heat and pressure to said foam side wall,
  (ii) thermally and compressively forming at least a portion of said foam material in the shape of said last,
  (iii) cooling said portion of said foam material in a compressed state, and
  (iv) setting said portion of said foam material in the shape of said last while said portion of said foam material is in said compressed state; and (F) opening the mold and removing the molded article of footwear from the last.

* * * * *